Aug. 4, 1931.  A. H. WILSON  1,816,884
SAFETY BRAKE
Filed May 11, 1929
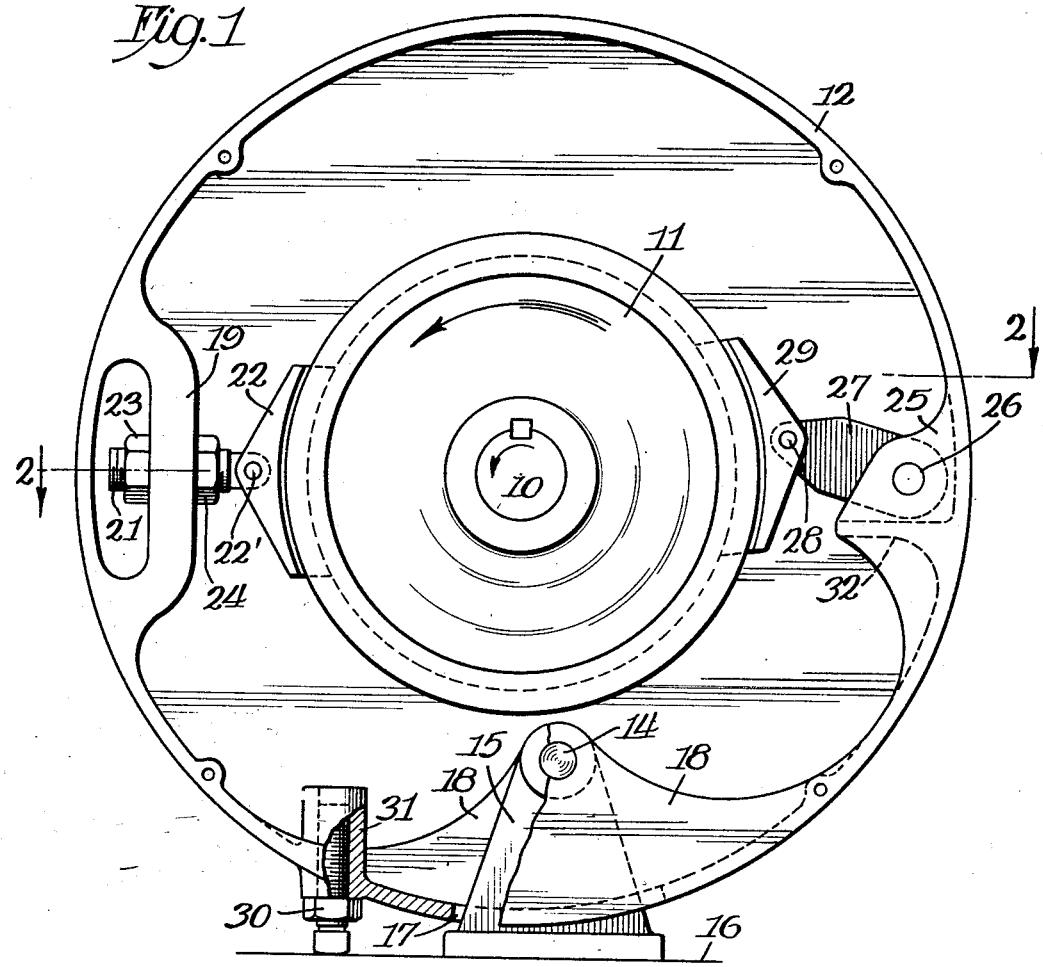
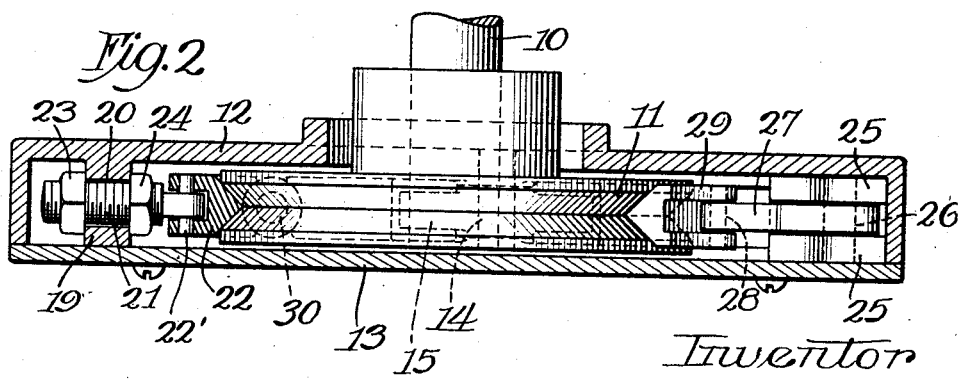
Inventor
Alexander H. Wilson
By Fisher, Clapp, Soans & Pond
Attys Patented Aug. 4, 1931

1,816,884

UNITED STATES PATENT OFFICE

ALEXANDER H. WILSON, OF OAK PARK, ILLINOIS, ASSIGNOR TO THOMAS ELEVATOR COMPANY, OF CHICAGO, ILLINOIS, A CORPORATION OF ILLINOIS

SAFETY BRAKE

Application filed May 11, 1929. Serial No. 362,200.

This invention relates to the art of safety brakes or clutches that are employed in association with rotating machine elements, such as shafts, that turn always in one direction under load, to arrest an accidental back-turning movement of the shaft or other rotating element under the pull of the load in case of breakage or slip of the driving means of such rotating element. Such safety devices are particularly useful in connection with hoisting apparatus of various sorts, to prevent damage and possible injury from the sudden dropping of a loaded cage or other form of elevator that is hoisted through the agency of a shaft or other rotating member turning always in one direction; but they are also useful in other situations where it is desirable to prevent backward turning of a rotating member under load.

The main object of the present invention is to provide a simple, inexpensive, quick acting, and highly efficient automatic safety device in the general nature of a non-reversible brake or clutch for the uses and applications above indicated. Another object is to provide an automatic safety brake of the character indicated wherein the principal brake elements shall be capable of nice adjustment to insure perfect cooperation and to compensate for wear. A further object is to provide an automatic safety brake wherein the power of the brake will be increased in proportion to the load against which the brake works.

Still further objects and attendant advantages of the invention will be apparent to persons skilled in the art, as the same becomes better understood by reference to the following description, taken in connection with the accompanying drawings in which I have illustrated one practical and approved embodiment of the invention, and wherein—

Fig. 1 is an elevation of the device with the front cover of the pivoted brake shoe holder removed;

Fig. 2 is a horizontal section on the line 2—2 of Fig. 1, looking downwardly and with the cover in place.

Referring to the drawings, 10 designates a shaft which may be assumed to rotate always in the direction indicated by the arrow when under load, and accidental backward turning of which, under the pull of the load, my improved safety brake or clutch is designed to prevent. Keyed on one end of this shaft is a brake drum 11. Encircling the drum 11 is a brake shoe holder comprising, in the instance shown, a shallow cup-shaped body 12 and a detachable cover plate 13. The body 12 also encircles the shaft, with clearance as shown in Fig. 2, to permit a tilting movement of the brake shoe holder as hereinafter described. The brake shoe holder is pivotally supported on a pivot pin 14 which may be mounted in the upper part of a pedestal 15 resting on the floor or a suitable platform 16 and projecting into the holder through an opening 17 in the rim of the latter; the ends of the pin entering holes in a pair of webs 18 cast in the holder body 12. It will be noted that the opening 17 is wider than the portion of the pedestal occupying the same, to permit a limited tilting movement of the holder hereinafter described.

In one side of the holder is cast a rib 19 having a transverse hole 20 in which rib is fitted a brake shoe stem or shank 21 herein shown as a short threaded rod, on the inner end of which is pivoted at 22' a brake shoe 22. The stem 21 is adjustable endwise in the hole 20, and is locked in adjusted position by nuts 23 and 24, whereby the shoe can be nicely adjusted for proper engagement with the brake drum.

At a diametrically opposite point in the holder 12, there is mounted in and between a pair of cast webs 25 a pivot pin 26 that supports the outer end of an upwardly and inwardly inclined toggle link 27. On the inner free end of link 27 is pivotally mounted at 28 a brake shoe 29 that seats on the periphery of the drum. It will be observed that the pivot 28 lies above a line drawn between the axis of the drum and the pivot 26, so that the link 27 and shoe 29 form the two arms of a toggle which tends to straighten under the friction of the drum on shoe 29 when the drum starts to rotate backwardly or in a clockwise direction viewing Fig. 1; the normal or forward direction of the drum being counter-clockwise, as shown by the arrow.

It will be observed that the pivot 14 of the brake shoe holder lies below the axis of the drum and to one side of a vertical line passing through the center of gravity of the holder, so that the latter tends to tilt by gravity toward the left, viewing Fig. 1, or in the forward turning direction of the drum and its shaft; and the gravity tilting movement is limited by a suitable stop which is preferably adjustable, such as the threaded pin 30 entering a tapped boss 31 in the lower side of the rim of the holder and resting at its lower end on the floor or platform 16.

The operation will be readily apparent from the foregoing description. So long as the shaft and drum are turning in the normal forward-working direction indicated by the arrows, both brake shoes ride idly over the periphery of the drum. The instant the shaft and drum start to turn in the opposite or backward direction, the friction of the drum on shoe 29 tends to straighten the toggle, and this forces link 27 outwardly, tilting the brake shoe holder to the right, viewing Fig. 1, and this jams brake shoe 22 hard against the drum, arresting further tilting movement of the holder and so causing both shoes to tightly grip and clamp the drum, and the heavier the load, the harder will be the jamming action of the shoes on the drum. Subsequent rotation of the drum and shaft in normal forward direction breaks the toggle, permitting the holder to tilt back to the normal position shown in Fig 1 until arrested by stop 30. To prevent the possibility of shoe 29 and its link 27 being thrown backwardly against the rim of the holder, I provide a web 32 between the webs 25, which acts as a stop for the heel of link 27.

While I have herein in shown and described for purposes of illustration one practical mechanical form of the invention, I do not limit the latter to the details of structure and arrangement shown and described, but reserve all such variations and modifications as fall within the spirit and purview of the appended claim.

I claim:

1. In an automatic safety brake of the type described, the combination with a horizontally rotating brake drum, of a brake shoe holder pivotally mounted below the axis of said drum and to one side of a vertical line passing through the center of gravity of said holder, said holder having portions lying on opposite sides of said drum, a pair of brake shoes so mounted on said oppositely lying portions of the holder as to ride idly on said drum when the latter is rotating in the direction in which said holder tends to tilt by gravity, and to grip said drum under the friction of the latter on one of said shoes where the drum rotates in the opposite direction, and a stop limiting the gravity tilting movement of said holder.

2. In an automatic safety brake of the type described, the combination with a horizontally rotating brake drum, of a brake shoe holder pivotally mounted below the axis of said drum and to one side of a vertical line passing through the center of gravity of said holder, said holder having portions lying on opposite sides of said drum, a brake shoe mounted on one of said oppositely lying portions of the holder and movable under a tilting movement of the latter into braking engagement with said drum, a link pivoted on the other oppositely lying portion of the holder, a brake shoe mounted on the free end of said link, said last-named brake shoe and its link forming a toggle which tends to straighten under the friction of the drum when the latter rotates in a backward direction, and a stop limiting the gravity tilting movement of said holder.

3. In an automatic safety brake of the type described, the combination with a horizontally rotating brake drum, of a brake shoe holder encircling said drum and pivotally mounted below the axis of the latter and to one side of a vertical line passing through the center of gravity of said holder, an endwise adjustable brake shoe stem mounted on one side of said holder, a brake shoe pivoted on the inner end of said stem, a link pivoted on the opposite side of said holder, a brake shoe pivoted on the inner end of said link, said last-mentioned brake shoe and its link forming a toggle which tends to straighten and tilts said holder against gravity where the drum rotates in a backward direction, and an adjustable stop limiting the gravity-tilting movement of said holder.

4. In an automatic safety brake of the type described, the combination with a rotatable shaft and a brake drum fast thereon, of a rigid brake shoe holder mounted eccentrically of the axis of said drum on a single pivot and encircling said shaft with clearance, and a pair of brake shoes mounted on said holder on opposite sides of said shaft, said brake shoes being so mounted as to ride idly on said drum when the latter rotates in one direction and to grip said drum under a tilting movement of said holder when the drum rotates in the other direction.

5. In an automatic safety brake of the type described, the combination with a rotatable shaft and a brake drum fast thereon, of a rigid brake shoe holder mounted eccentrically of the axis of said drum on a single pivot and encircling said shaft with clearance, a brake shoe mounted on said holder on one side of said shaft and movable under a tilting movement of the latter into braking engagement with said drum, a link pivoted on said holder on the opposite side of said shaft, and a brake shoe pivotally mounted on the free end of said link, said last-named brake shoe and its link forming a toggle which straightens and tilts said holder thereby carrying said first-named brake shoe into engagement with said drum when the latter rotates in a backward direction.

ALEXANDER H. WILSON.